Nov. 24, 1970     F. A. MORRIS     3,543,266
MONITOR SYSTEM EMPLOYING TOUCHTONE KEYSET
SELECTION OF MONITORED POINTS
Filed April 13, 1967     11 Sheets-Sheet 1

INVENTOR
FRANK A. MORRIS

BY

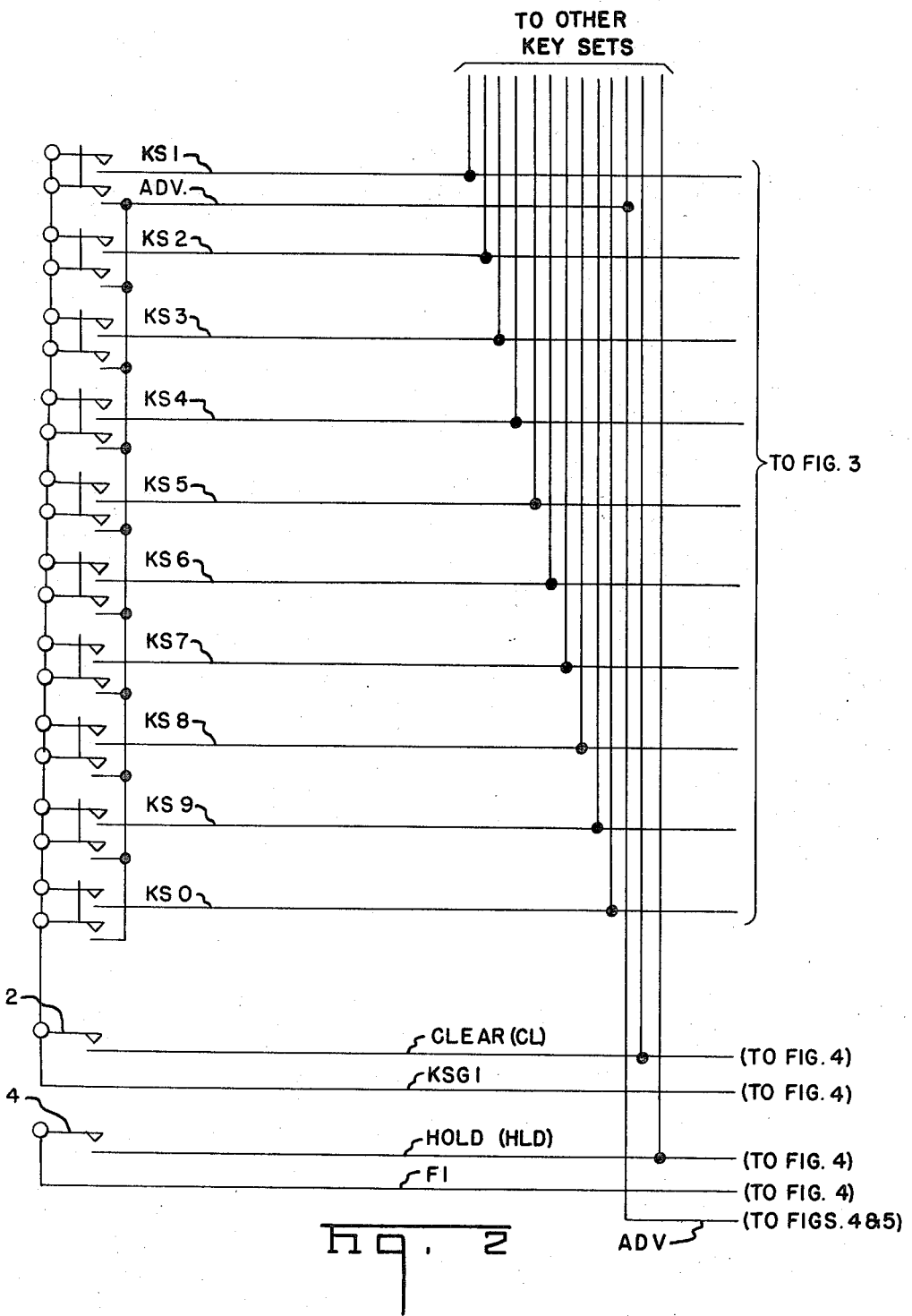

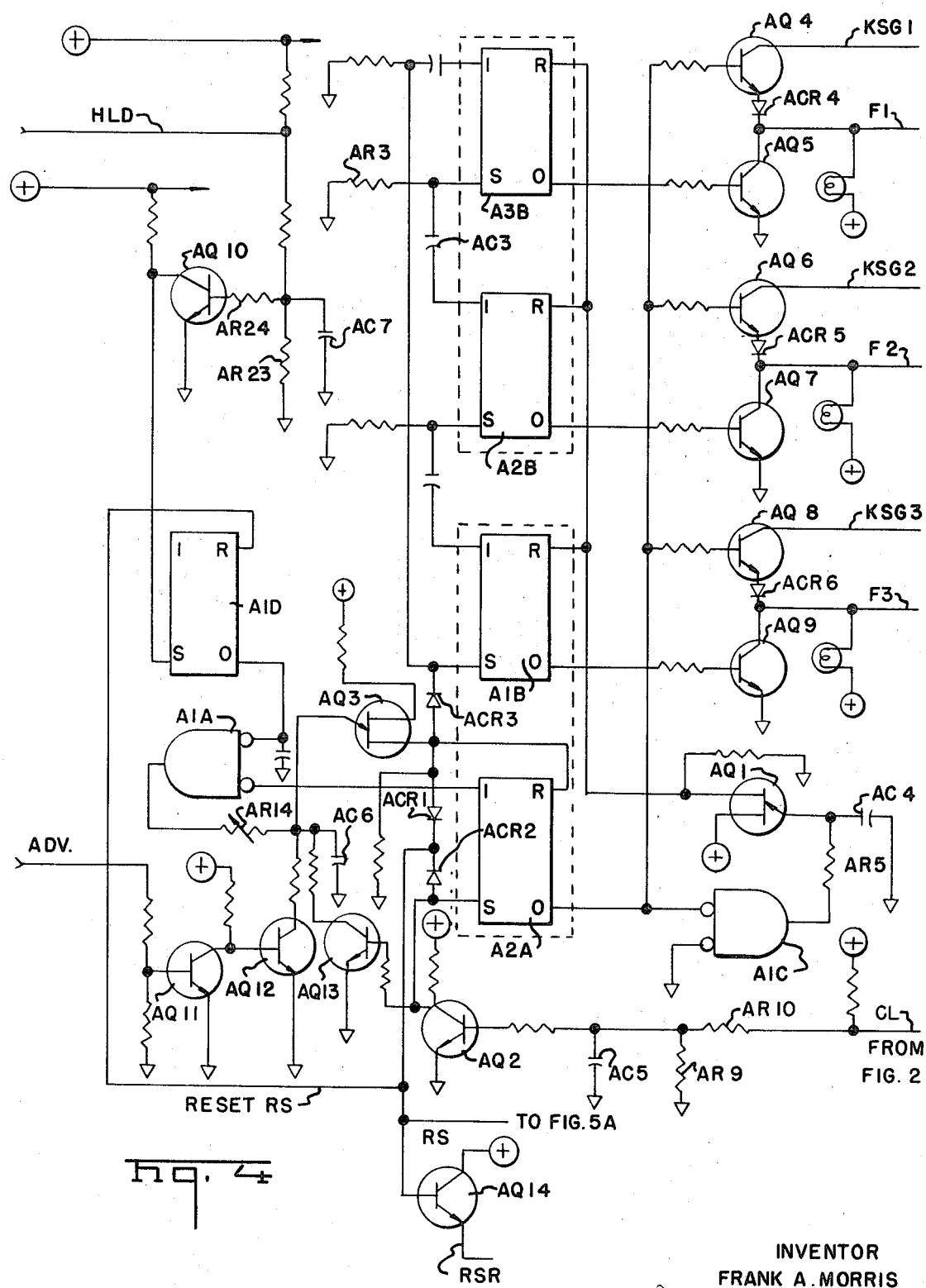

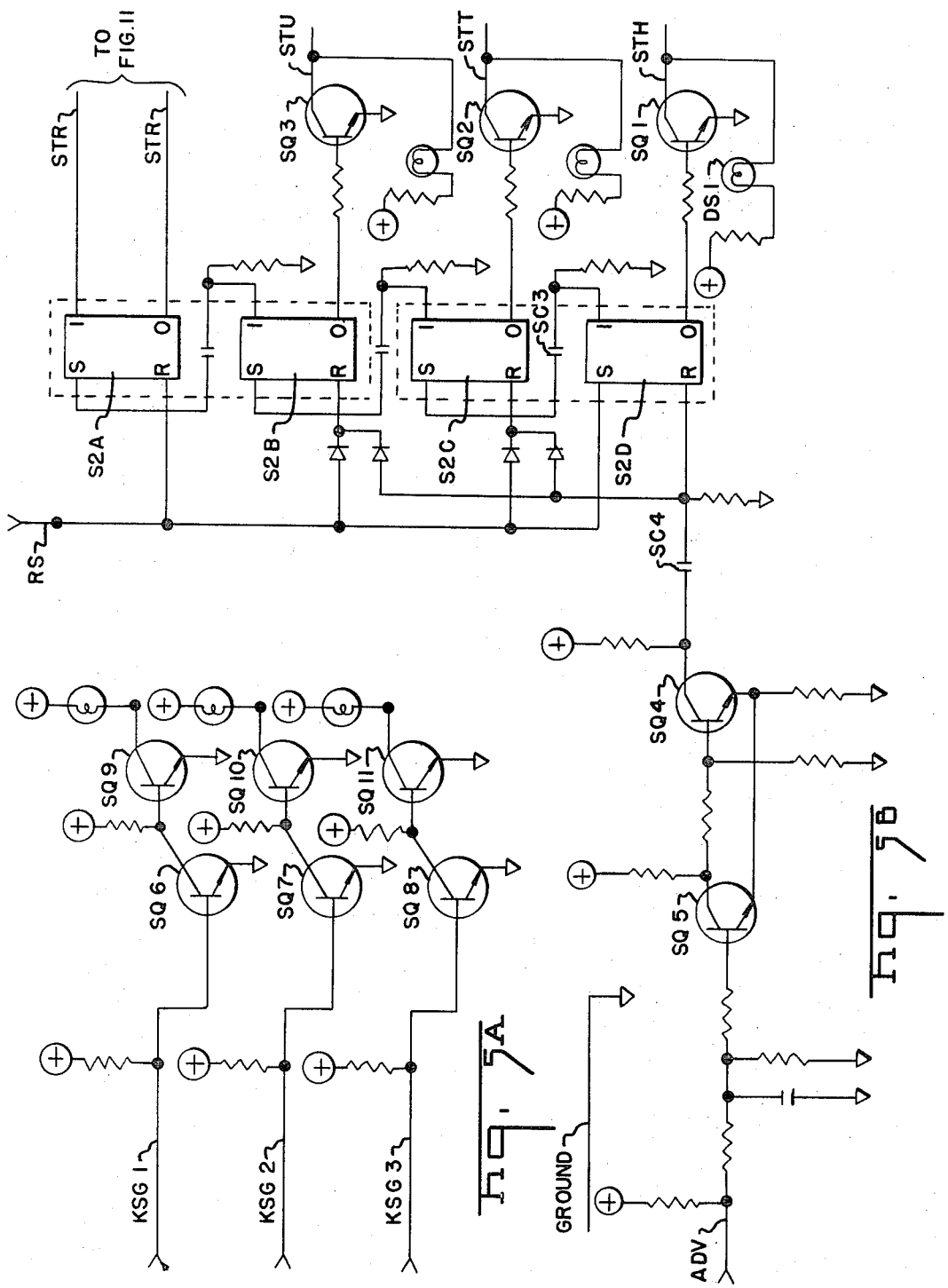

INVENTOR
FRANK A. MORRIS

INVENTOR
FRANK A. MORRIS

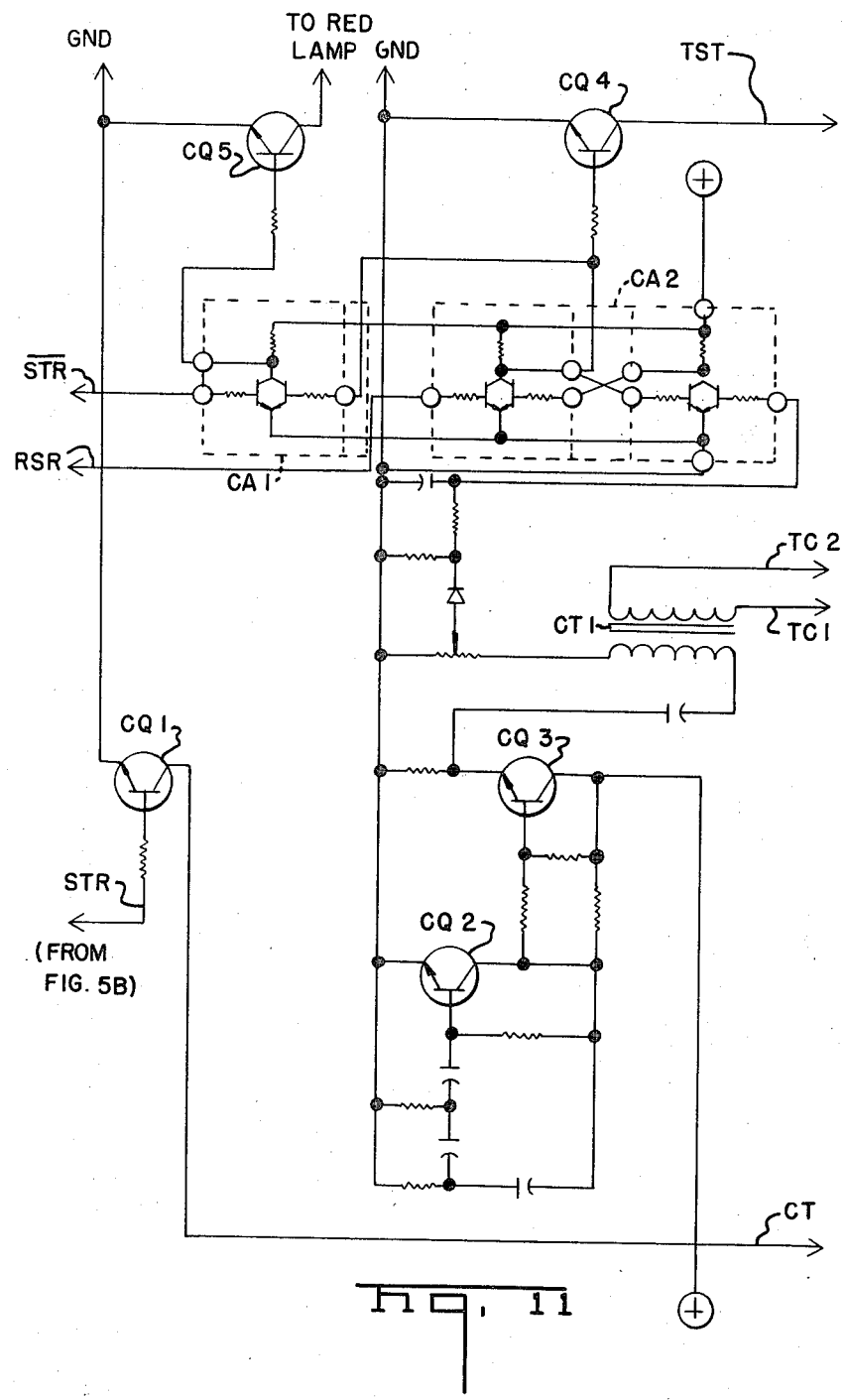

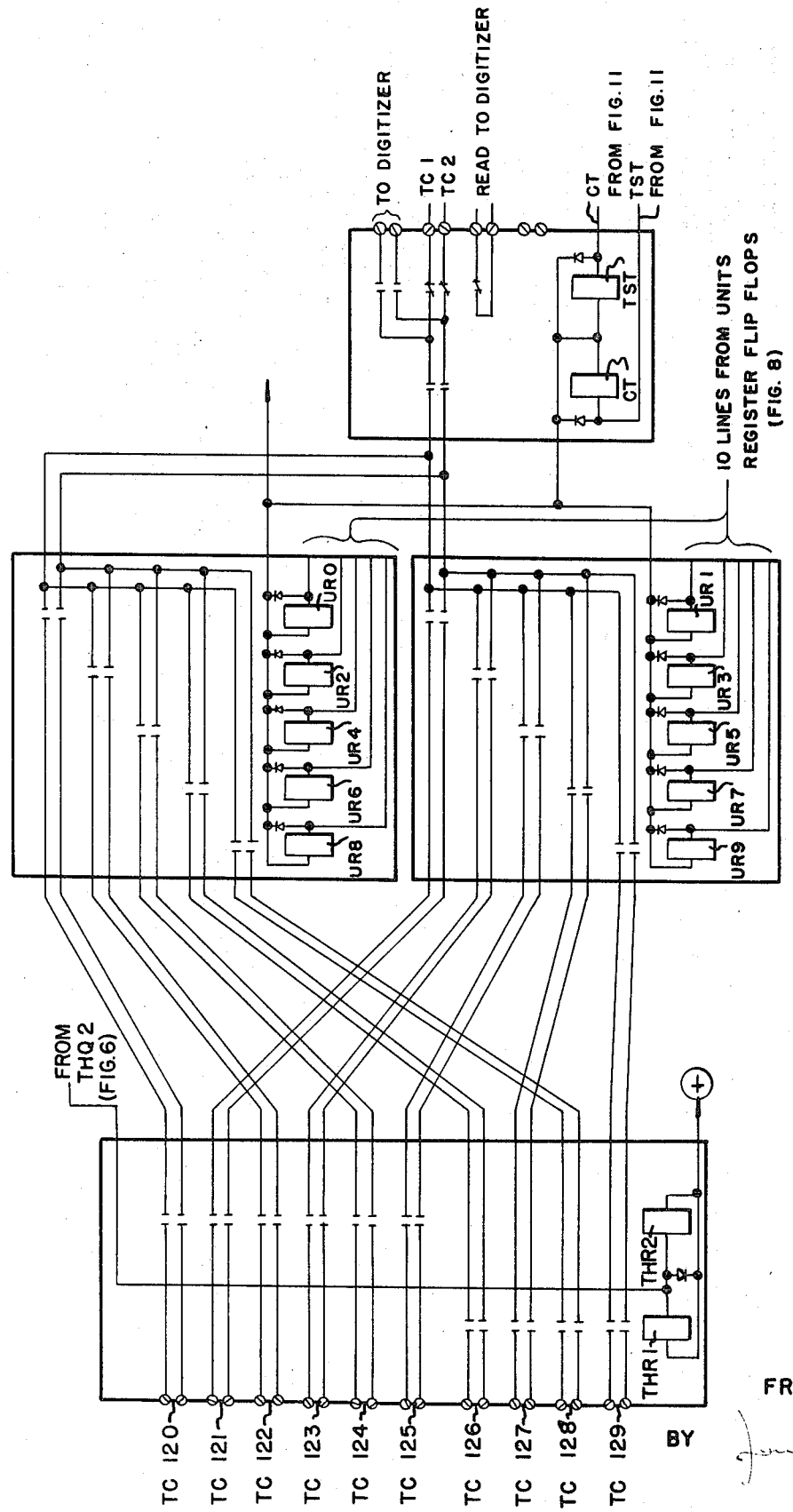

3,543,266
MONITOR SYSTEM EMPLOYING TOUCHTONE
KEYSET SELECTION OF MONITORED POINTS
Frank A. Morris, Naples, N.Y., assignor to Transmation,
Inc., Rochester, N.Y., a corporation of Ohio
Filed Apr. 13, 1967, Ser. No. 630,753
Int. Cl. G08b 19/00; H04m 3/00
U.S. Cl. 340—412                        4 Claims

ABSTRACT OF THE DISCLOSURE

The disclosure relates to a system wherein connection can be established between a control station and any one of many temperature points. Selection is accomplished by the use of a keyset which can be similar to that employed in Touchtone telephones. Switching is accomplished by reed relays under the direction of semiconductor logic. The signal path is suitable for both the very low level signals derived from thermocouples and similar devices or the higher level milliampere signals that are standard in the instrumentation field. In its basic form as disclosed herein, the system accepts three selection digits and thus has potential access to 1000 temperature points. Due to its modular construction, it can be readily equipped for varying capacities. It is possible to have several control stations although only one can be in use at a time. Provision is made to prevent interference between stations. There may also be several displays.

---

The invention relates to a monitor system and more specifically to a system wherein transducers or the like at any one of plural remote points can be connected to a central station and sampled therein.

Monitor systems have been well known in the prior art. However these systems have been relatively expensive to produce and operate and required expensive wiring running directly from the central station to each remote point. Systems of this type are restricted in the number of outlying or remote points they can monitor, primarily due to the economics of the huge wire requirement.

These problems of the prior art are overcome in accordance with the present invention wherein the amount of wire required is materially reduced. This is accomplished by connecting all of the remote points and the thermocouples, or other transducers or the like associated therewith at the remote point, to a switching station in the vicinity of the remote points under control of a local central station. The remote points can thereby be selectively switched into the system, the signal therefrom being transmitted to the local central station via wires which are far less in number than the number of outlying remote points.

It is therefore an object of this invention to provide a monitor system which is relatively inexpensive to produce compared with prior art systems.

It is a further object of this invention to provide a monitor system having two step actuation of a control station to minimize false registration.

It is a yet further object of this invention to provide an automatic continuity check of a selected circuit when the circuit is selected and before a reading is provided.

The above objects and still further objects of this invention will become apparent to those skilled in the art from the following description of a preferred embodiment of the invention, which is provided by way of example and not by way of limitation, wherein:

FIG. 2 is a circuit diagram of the keyset circuit of the present invention;

FIG. 3 is a circuit diagram of the keyset termination circuits of the present invention;

FIG. 4 is a circuit diagram of the allotter circuit of the present invention;

FIG. 5A is a circuit diagram of the lamp indicators associated with the allotter circuit;

FIG. 5B is a circuit diagram of the steering circuit of the present invention;

FIG. 11 is a circuit diagram of the continuity checker circuit of the present invention; and FIG. 12 is a schematic diagram of a typical part of the relay Christmas tree type network in accordance with the present invention.

The preferred embodiment of the invention will now be described in conjunction with the above indicated drawings.

Control Station

Figure 1:
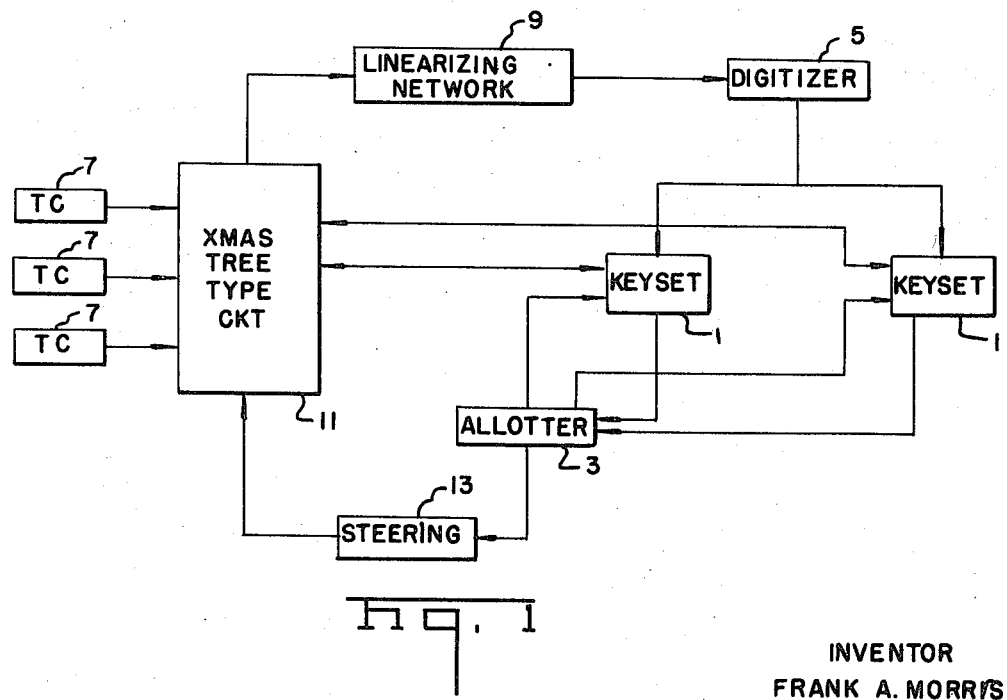
FIG. 1 is a block diagram of the monitor system in accordance with the present invention.

Each control station includes a keyset 1 (FIG. 1), having a three-digit Identification Display and a four-digit Temeperature Display. The keyset has 12 keys—ten numeric keys and two function keys, arranged in the conventional 3-by-4 array. Displays of this type are well known, one such display being used in a linearizing digital thermocouple indicator produced by Transmation Inc., Rochester, N.Y. under the name "LINITEMP."

The switching, logic and temperature converting equipment as well as the terminal blocks for the thermocouple lines can be located at some distance from the control stations and in the vicinity of the remote stations, provided the resistance of the interconnecting cable between the key set and the unit housing the switching, logic and temperature converting equipment is sufficiently low.

The system is activated by depressing the CLEAR key 2 (FIG. 2). Indication of this operation is provided by a green background lighting of the Identification Display (ID) (not shown). The three digits of the desired point number are then keyed in succession using the ten numeric keys. The first digit will be displayed in the Hundreds window of the ID, the second digit in the Tens, and finally, the third and last digit in the Units window. The depression of the CLEAR key operates the allotter circuit 3 and the digit keys properly positioned, integerwise, under control of a steering circuit 13 which operates under the control of the allotter 3. The operator thus has displayed before him the complete number which verifies the accuracy of keying as well as providing a reminder of the point being read.

Upon releasing the units digit key, a continuity test is conducted, indicated by a brief flash of red background in the Temperature Display (TD). This is followed by an appearance of the temperature reading.

Timeout

An automatic timeout circuit is activated when the CLEAR key 2 is depressed and will effect an eventual release of the system within a predetermined time unless further action is taken. Timeout is easily adjusted for a wide range of values.

Each time a numeric key is depressed, the timeout is reset and the system is held for another period. This mode of operation assures a uniform temperature display period despite a wide range of keying speeds.

At the expiration of the timeout, the display is wiped out, the connection dropped, and the system is released.

Temporary Hold

If the operator desires to observe a temperature trend for longer than the timeout period, he can do so merely by holding any numeric key depressed after keying the selection digits. The timeout circuit is disabled as long as the numeric key is held. The digitizer "tracks" by taking a new reading every few seconds as indicated by a brief "wink" of the temperature display. Upon releasing the numeric key, the system will time out and release automatically.

Extended Hold

Should it be desired to observe trends for extended periods, the HOLD key 4 (FIG. 2) may be momentarily depressed at any time after the system has been activated but, of course, before the timeout period has expired. This causes a permanent disablement of the timeout circuit until released by depressing the CLEAR key 2. This permits the operator to leave the control station and observe the trend at a distance.

It must be remembered that only the CLEAR key 2 at the control station which activated the system can be used to release a HOLD condition (purposely arranged so that another station cannot spoil an important observation). No other station can function as long as the HOLD condition persists.

Lockout

Interference between stations in a multistation system is prevented by a lockout which disables all but the station which first activates the system upon depression of its CLEAR key. Successful seizure is indicated by the green background lighting of the associated ID display windows. The background of the locked out stations remains dark. Indication that the system is in use is provided by the appearance of numerals in the displays of all stations.

In the event of simultaneous depressing of the CLEAR keys at two or more stations, the Allotter circuit 3 (FIG. 1) (to be explained hereinbelow) makes an arbitrary selection and assigns the system to only one of the stations. Other stations are disabled until the system is released. It is theoretically impossible for two stations to seize the system under any combination of conditions.

Camp On

In the event an operator wishes to make use of the system already engaged by another station, he may keep his CLEAR key depressed and "camp on" the system so that, the instant it is released, it will become available to him—indicated by the eventual appearance of the green background illumination. Since, however, the decision of the Allotter 3 is random, he may not necessarily get access to the system when it is released in the event that some other station is likewise camping on.

Continuity Check

A continuity check is activated upon release of the key depressed to make the units selection of a remote point. It functions by making a resistance check of the signal loop between the digitizer 5, the linearizing network 9 and the thermocouple 7. As pre-set, any loop less than say 1000 ohms resistance will pass the resistance check and the signal will then be extended to the digitizer. Any loop measuring more than (for example) 2000 ohms will fail the resistance check and the system remains passive until either the fault is corrected or the system is released.

Activation of the continuity checker causes a red background illumination of the temperature display windows (except for the first window). The red background disappears when the test is passed successfully. In a sense, therefore, the system is fail safe inasmuch as the red background must be removed by a successful test.

The digitizer 5 is not activated until the continuity check is successfully completed. Very shortly after the red background disappears, the temperature numerals appear. The slight delay between the two events is provided to permit the digitizer to stabilize and deliver a true reading.

The continuity check provides an excellent and convenient means of locating faults. By shortcircuiting the signal pair progressively from incoming terminals to other test points, to be described herein, until the red background disappears, it can be readily determined whether or not the fault lies externally to or within the equipment cabinet and even at what point in the switching system if the fault is internal.

Basic Switching Plan

To provide for maximum numbering flexibility and to obtain greatest switching efficiency with reed relays (shown, for example, as a Christmas tree type circuit 11), the temperature points are arranged in groups of 10. A path to any desired temperature point is established in two steps.

In the first step, the entire group of 10 points in which the desired point appears is switched through by a "gang" relay having 20 contacts (since the pairs are switched on a balanced basis).

In the second step, the one desired point is selected from among these ten extended by the gang relay by the closure of a Units relay having two contacts.

This plan is easily understood when it forms part of a two-digit system if, for example, one wishes to select point #23. By usual number standards, this implies that the desired point lies in the *second* group of 10 points and is the *third* point within that group. To make the selection, it is only necessary to operate the *second* gang relay and the *third* units relay.

Three-Digit Translation

Because the present system makes use of the decimal system as its input, three input digits are employed to make a selection of more than 100 points. This is accomplished by storing the three selection digits in Registers and then by combining the stored Hundreds and Tens digits in the Gate-Driver circuit to select a single gang relay. The stored Units digit is used directly to operate the proper Units relay. The gang relays are called Tens-Hundreds since they employ those two digits in their operation. In this way, the three-digit input is essentially translated into a two-digit output.

To clarify this by example, assume that point #123 is to be selected. Using the normal numbering scheme, it means that the desired point lies within the *twelfth* group of ten points and is the *third* point within that group. The *twelfth* Tens-Hundreds and the *third* Units relay should be operated to reach the point.

Selecting the Tens-Hundreds Relay

Strictly from a numbering standpoint, the points are arranged in groups of 100. Since each gang relay controls 10 points, it is evident that there must be 10 gang relays for each group of 100 points. In a 400-point system, therefore, there will be four groups of gang relays or a total of 40 gang relays.

Returning to the example of point #123 and using the normal numbering scheme, the digits indicate that the desired point lies within the first group of 100 points (thus will be switched by the first group of gang relays) and is in the second group of 10 points within that hundred points (thus will be switched by the second gang relay within the first group of gang relays). This will become more clearly understood when the detailed circuit operation, to be described later, is discussed.

GENERAL CIRCUIT DESCRIPTION

Seizure

When idle, the present system can be seized and placed at the exclusive disposal of a control station (keyset 1) by depressing the CLEAR key 2 (FIG. 2) of that station.

In order to function, a control station must be supplied with an energizing ground. To prevent interference and simultaneous seizure by more than one station, each station is momentarily energized in rotation. Depressing the CLEAR key arrests this rotation and causes the activating ground to remain, thus permitting the control station to select a temperature point and obtain a reading. Since the other control stations receive no ground as long as the rotation is arrested, they are unable to affect the operation of the system in any way.

Allotting

The rotational energization of control stations is effected by the Allotter circuit (FIG. 4). It comprises a flip-flop for each station interconnected to form a "ring." In the reference drawing, flipflop A3B is associated with the first control station. The buffer transistor AQ5 does the actual gating of the activating ground over the FIND (F1) lead terminating on the CLEAR key 2.

The ring circuit is advanced a step for each pulse furnished by the unijunction oscillator AQ1 having a repetition rate in the order of 1000 p.p.s. As is characteristic of ring circuits, only one of the flipflops will be in a Set condition at any one time, all others being in the Reset condition. Due to the fact that the ring has three stages, no precautions are required to "prime" it into the proper pattern. It automatically assumes a correct condition after a single drive pulse has been applied.

Each time flipflop A3B is driven into the Set condition, the 0 output becomes positive, causing AQ5 to become conductive thereby gating ground to the F1 lead.

Stopping the Allotter

The emitter voltage for the unijunction oscillator AQ1 is supplied through the inverter A1C. During the Idle condition, the gate permits the unijunction oscillator AQ1 to free-run.

When the CLEAR key 2 (FIG. 2) is depressed, the momentary activating ground is transmitted over the CLEAR (CL) lead connecting all control stations in common to the allotter stopping circuit involving flipflop A2A (FIG. 4). The ground on the CL line removes the positive bias from the buffer inverter transistor AQ2, effecting the transition of the stopping flipflop A2A to the Set condition which, in turn, causes the output inverter A1C to stop the generation of drive pulses by AQ1. The CLEAR key 2 thus causes the ring (composed of flipflops A1B to A3B) to stop at its own position and sustain the activating ground (i.e. the position corresponding to the keyset at which the CLEAR key was depressed).

The Zero (0) output of the stopping flip-flop A2A also supplies base current to the gate transistors such as AQ4 which control the extension of ground to the Keyset Ground (KSG1) lead 1, there being one KSG lead individual to each keyset. Although all of these gate transistors are energized together, it will be noted that they are in series with their respective FIND gates to form two-input AND gates, exemplified by the combination of AQ4 and AQ5. Because of this, only one (KSG) lead is grounded to permit only one set of numeric keys to be used.

If it were not for this two-step activation of a control station, false registration could occur by depressing numeric keys while the system was presumably idle. It will be later shown that the initial operation of the CLEAR key 2 not only seizes the system but also erases any false registration which might inadvertently be entered while testing or servicing the system.

Seizure Indication

The operator of a control station is informed of successful seizure by a green background illumination of the Identification Display (ID). A verification of some sort is required since, for instance, some other station might call for the system at the same instant and the operator would have no other way of knowing that he had not gained access than by finding that his numeric key depressions were ineffective.

Although it would be possible to operate a single pilot lamp directly from the Keyset Ground (KSG) lead to provide the operator with seizure indication, the green background lighting can involve several larger lamps and thus two-stage amplifiers in the form of inverter SQ6, SQ7, or SQ8 (FIG. 5A) and power driver SQ9, SQ10 and SQ11 are employed to provide adequate lamp drive. Only that station having green background illumination is in control of the system. All other stations have a dark background.

Keying

Upon getting seizure indication in the form of the green background illumination of the ID display, the operator depresses sequentially the three numeric keys to register the digits of the desired point number in the order of reading from left to right.

Two contacts are closed by each numeric key (FIG. 2). One is individual to each numeric key (KS1, KS2, etc.) and informs the register of the value of the digit to be stored. The other is common to all numeric keys and connects to the ADVANCE (ADV) lead to control the Steering circuit (FIG. 5B).

The depressing of a numeric key grounds the associated (KS) lead and removes a positive bias to effect the operation of a register gate (to be explained hereinbelow). Upon releasing the numeric key, the (ADV) lead causes the Steering circuit to prepare a new section of the register to receive another digit for storage. Upon releasing the key selecting the third digit, the (ADV) lead causes the steering circuit to institute the cut-through and continuity test procedures in preparation to displaying the temperature (to be explained hereinbelow).

KEYSET TERMINATION

The network (FIG. 3) terminating each numeric key bus such as (KS1) and mounted on the Keyset Termination card serves to protect the logic equipment from transients and other spurious signals. The positive bias furnished from the source is limited to render the system intrinsically safe and divided down to a suitably low potential to apply to the integrated circuit package inputs. Spurious signals on the leads are also divided by this same network which further rejects higher frequency components by virtue of the filter capacitor.

REGISTRATION

Three Registers (FIGS. 8 to 10) are provided to store the Hundreds, Tens, and Units digits of the point number.

Storage takes place in flipflops which are moved into the Set condition when an associated numeric key is depressed and remain locked in that condition until the system is cleared.

In a fully-equipped three-digit system, there are 10 flipflops in each Register—one for each of the numerals from 0 to 9. The Register cards mount groups of five flipflops so that the Hundreds register may be only partially-equipped if the system is to have a capacity of 500 points or less.

It is evident that the depressing of the first-digit numeric key should set a flipflop only in the Hundreds Register, the second-digit numeric key only in the Tens, and the third-digit only in the Units Register. This is accomplished under the control of the two-input NAND gates which form part of the register and whose output is connected to the input of the flipflops.

When the system is seized and readied for registration, the Steer Hundreds (STH) lead (FIGS. 5 and 10) will be at ground potential, thus enabling one input of all the Hundreds Register gates. The gates are still disabled, however, by the positive bias supplied by the Keying (K1, K2, etc.) leads from the Keyset Termination network. The Steer Tens (STT) and Steer Units (STU) leads are at positive potential and thus all the gates of the other registers are disabled.

The depression of a numeric key, for example #1, will remove the positive bias by grounding the (KS1) lead and both inputs of the #100 NAND gate HN1 will thus be enabled. The resulting positive output from the gate will operate the #100 flipflop HF1 in the Hundreds Register. The #10 gates in the Tens Register are unable to operate since only one of their inputs is enabled and similarly for the #1 gate in the Units Register.

Upon release of the numeric key, the Steering circuit (FIG. 5B) will put a positive bias on the (STH) lead and ground the (STT) lead (FIGS. 5B and 9), thus preparing the Tens Register to accept the next digit for storage. Again, the depression of a numeric key, for example #2 will develop a situation wherein the #20 gate TN2 is the only one in all registers wherein both inputs are enabled and thus the #20 flipflop TF2 will be set.

Upon release of the second numeric key, the Steering circuit will replace the positive bias on the (STT) lead and ground the (STU) lead (FIGS. 5B and 8) to prepare for the registration of the Units digit as indicated for the tens and hundreds integers.

STEERING

The term "steering" refers to the act of directing keyed information into the proper registers. For instance, the numeric value of the first key to be depressed when selecting a point is "steered" into the Hundreds Register, the second into the Tens Register, etc.

The Steering circuit (FIG. 5B) comprises flipflops (52A, 52B, 52C and 52D) arranged in a "chain" somewhat similar to the "ring" of the Allotter (FIG. 4). The chain is not reentrant as is a ring and thus will not rotate if continuously driven.

The chain is driven by pulses obtained from a Schmitt Trigger circuit involving transistors SQ4 and SQ5. A positive pulse is developed each time a numeric key is released and the Advance (ADV) lead returns to a positive bias state. (Note that the key is registered upon depressing and steering is advanced upon release.)

The purpose of the Schmitt circuit is to develop a single sharp and clean drive pulse from the relatively poor and possibly mutilated pulse which might be derived from the key due to contact "bounce."

In its primed condition, the steering chain effects the grounding of the Steer Hundreds (STH) lead through buffer transistor SQ1, lighting associated lamp DS1 which also acts as the bias resistor. Each digit stage of the chain is equipped with such a lamp as an aid to servicing. The grounded (STH) lead enables the Hundreds Register to accept the first digit.

Upon release of the first numeric key to be depressed, the Schmitt trigger will produce a drive pulse, advance the chain to the Tens position, and the (STH) lead will become positive. The Steer Tens (STT) lead is now grounded and the Tens Register is enabled to accept the next digit.

Upon release of the third numeric key to be depressed, indicating that the entire three-digit number is now registered, the fourth stage S2A of the chain is Set and no further action of the numeric keys will have any effect on the chain. At that time the bias condition on the two Start Read (STR) and (STR̄) will be reversed to effect the cut-through and test function (explained hereinbelow).

Identification Display

As each digit is keyed up and stored in the Register, the appropriate numeral is projected in the (ID) display windows of all control stations (key sets).

Figure 8:
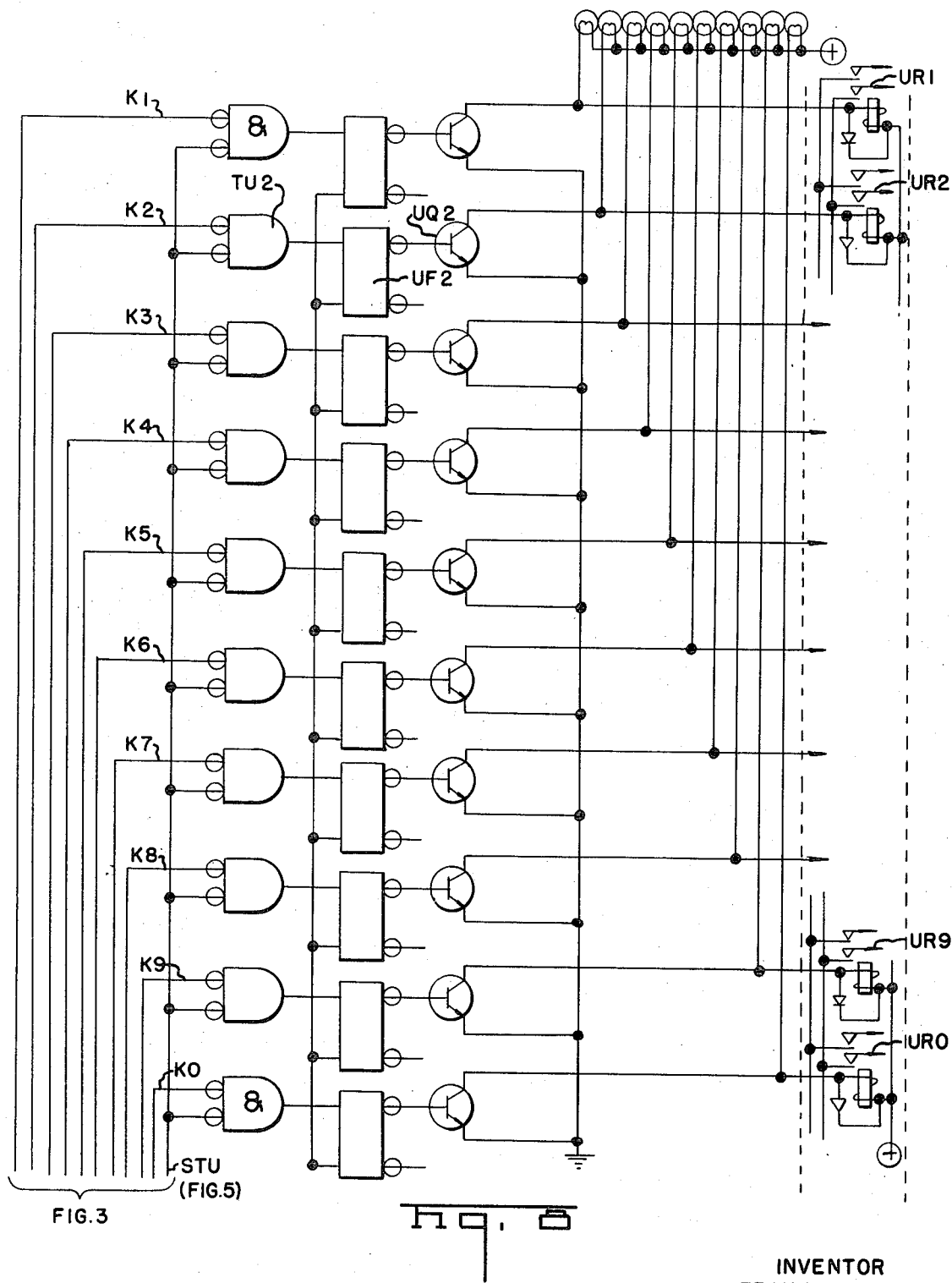
FIG. 8 is a circuit diagram of the units register circuit of the present invention.

The 0 outputs of the Register flip flops (FIGS. 8 to 10) are each connected to a buffer transistor which controls an associated display lamp. In the case of the Units Register, however, this same transistor also operates the Units relays (FIG. 8). It is evident that the lamp associated with each flipflop will remain lighted as long as the associated flipflop is in the Set condition.

Tens-hundreds relay operation

Each gang relay controlling a block of 10 points requires two digits for its selection—the Tens and the Hundreds digits—as outlined hereinabove.

Figure 7:
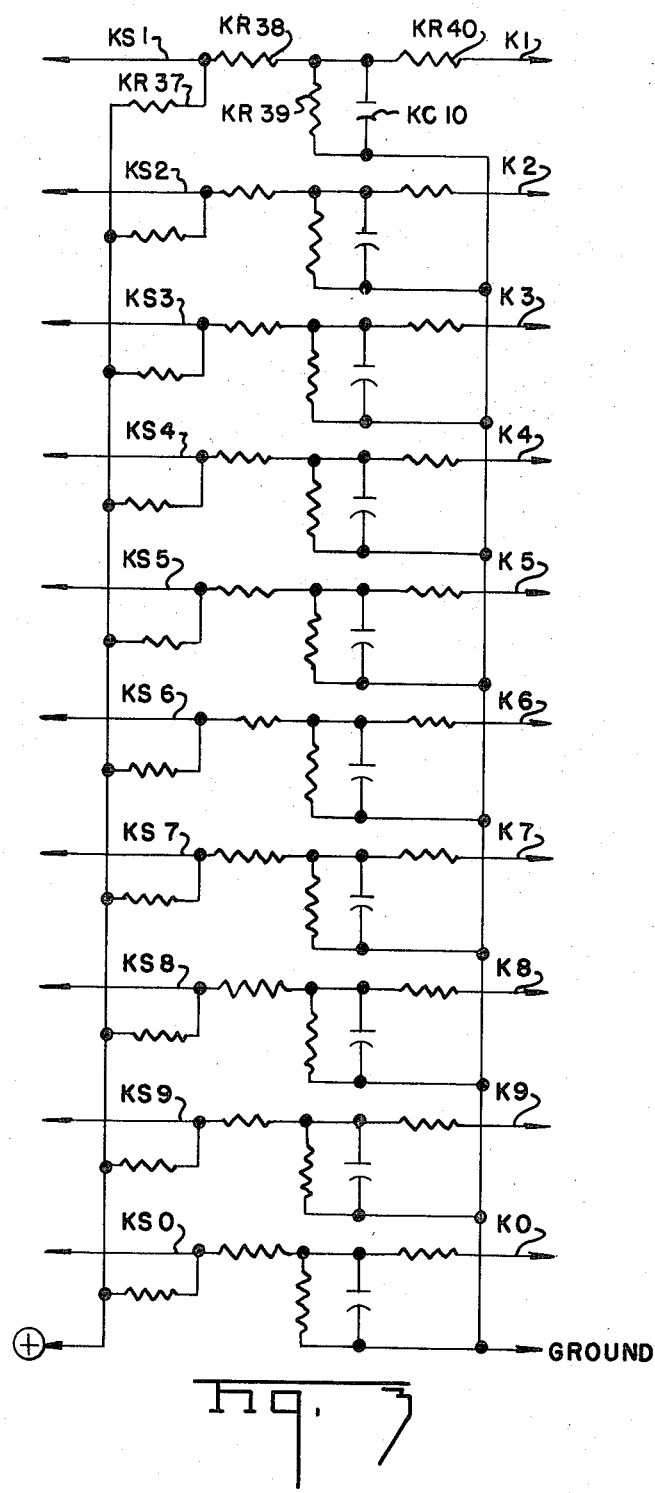
FIGS. 6 and 7 are circuit diagrams of two of the gate driver circuits of the present invention.
Figure 6:
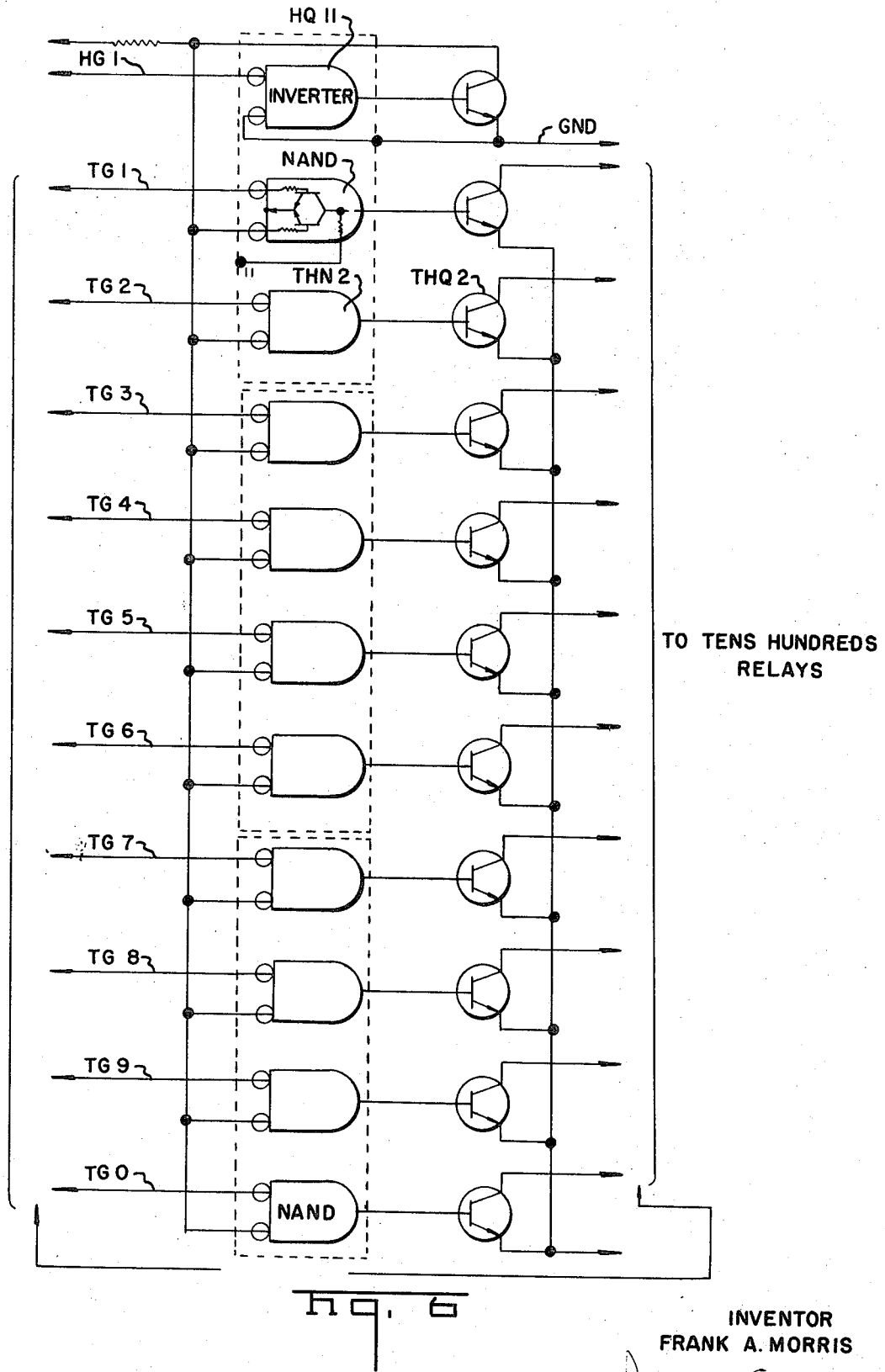
Figure 7:
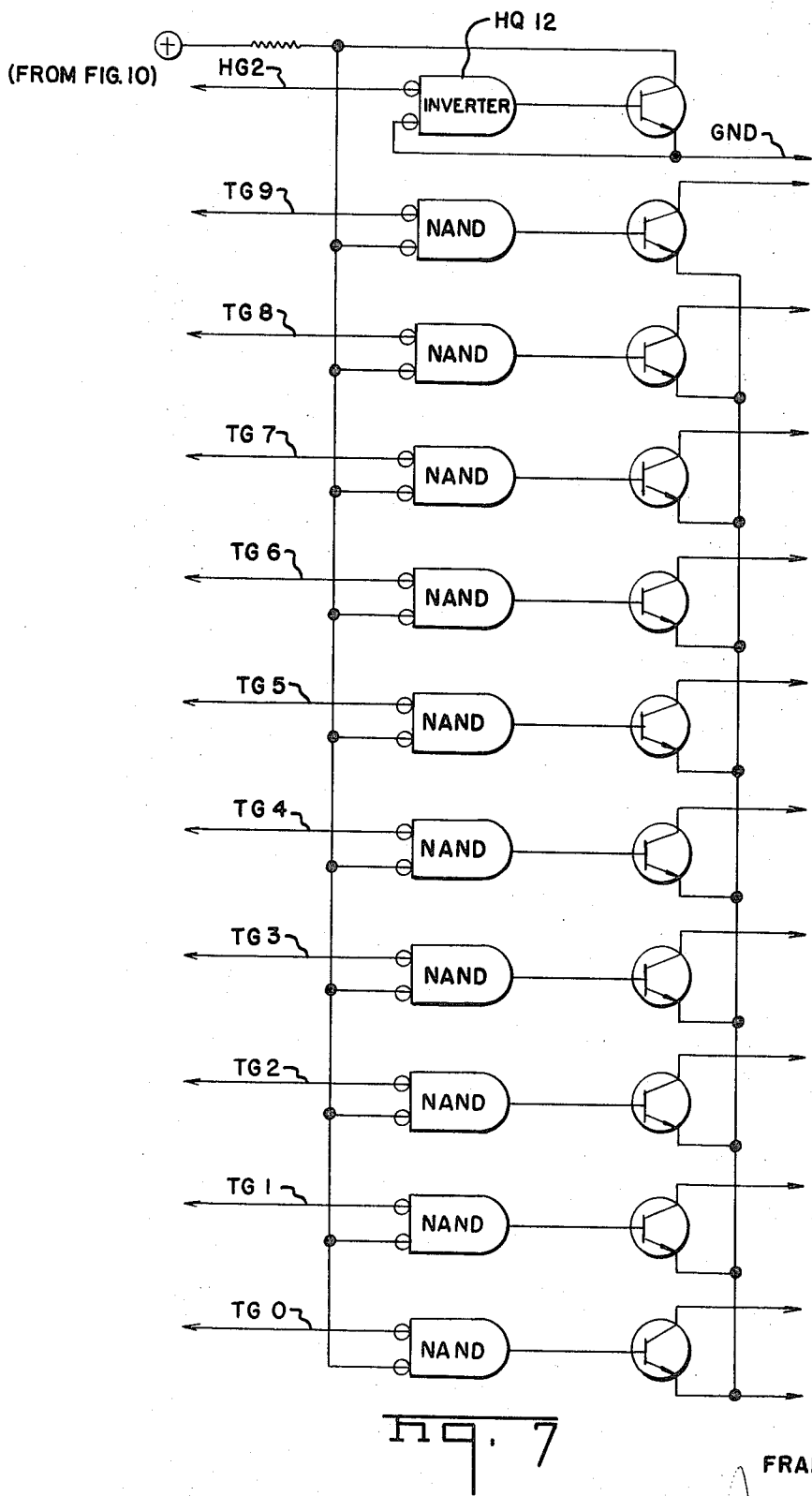

The combining of these two digits takes place in the gate driver circuits of FIGS. 6 and 7. Each card controls 10 gang relays and so only one card is required for each 100 points.

There is associated with each gang relay a corresponding two-input NAND gate. Until digits are registered, both inputs of all gates are held positive and thus disabled. The registration of a Hundreds digit will effect the grounding of the associated Hundreds Gate (HG) lead (FIG. 10), thus if #1 hundreds digit is registered, the (HG1) lead is grounded. The (HG) leads are inverted and buffered by the circuit involving HQ11 and HQ12 of FIGS. 6 and 7 in order to provide enough drive for all 10 gates.

The storing of a tens digit in the Tens Register (FIG. 9) will effect the transition of a single flipflop to its Set condition and the grounding of the (1) output to which a Tens Gate (TG1, TG2, etc.) is connected. The removal of positive bias will enable inputs to the corresponding two-input gates in the Gate-Driver cards.

If, for example, the digits 1 and 2 have been keyed in succession, the (HG1) lead (FIGS. 10 and 6) will be grounded to one of the two inputs of all gates on the #100 card (FIG. 6). The (TG2) lead (FIG. 9) will enable one of the two inputs of all the #2 gates on FIGS. 6 and 11. Only one gate in the whole array will have both inputs enabled namely, the #2 gate on the #100 card THN2, and thus only the one gang relay is operated, extending a group of ten points to the Units relays for the final selection of a single point. If the registered third digit is #3, the #3 Units relay will be operated and point #123 will be selected. The signal pair will be extended to the digitizer and the temperature will be displayed.

Timeout

When the CLEAR key 2 was initially depressed to seize the system, the (1) output of the stopping flipflop A2A (FIG. 4) became grounded and enabled one input of the two-input gate A1A. The second input is normally in the enabled condition by virtue of the (0) output of Holding flipflop A1D which is normally in the Reset condition. With both inputs enabled, gate A1A provides a positive bias to the emitter of the unijunction oscillator involving AQ3.

The time constant of this circuit is adjustable from a fraction of a second to several seconds, normally being set for about three seconds. It becomes evident that AQ3 will develop a pulse output approximately three seconds after the CLEAR key 2 is depressed provided no other circuit action takes place. If such a pulse develops, it is applied to the Reset (RS) lead to reset all flipflops in the entire system, including A2A and A1D. Not only does the unijunction timeout oscillator shut itself off after a single pulse output, but also effects the release of the whole system and its return to the Idle condition.

Timing reset

Timing Reset is accomplished by draining the charge from the timing capacitor AC6 (FIG. 4) of the timeout circuit. The grounding of the Advance (ADV) lead (FIG. 4) when any numeric key is depressed effects the cutoff of inverting transistor AQ11 and thus the application of a positive bias to the timing reset transistor AQ12 which becomes conductive and removes the charge from the timing capacitor AC6.

It is evident that timeout is thereby reset and rendered inoperative as long as any numeric key is held depressed and is restarted when the key is released. If desired, the system may be held by an operator for observing a trend by keeping any numeric key depressed after the third digit has been keyed.

Hold

The Hold feature permits operators to observe long-duration trends without the necessity of remaining at the control station or keeping a key depressed.

Hold is established by depressing the HOLD key 4 any time after the system has been seized but before timeout has occurred. Actually, the HOLD key may be depressed simultaneously with the numeric keys. Grounding of the HOLD (HLD) lead causes the transfer of the hold flipflop A1D to its Set condition thus disabling the gate A1A with a consequent stopping of the timeout circuit.

The Hold condition can be released only by depressing the CLEAR key at the holding control station. The system is not released until the expiration of the timeout, providing a guard against "stealing" the system by another control station in the event the CLEAR key was depressed to make a correction. It is, of course, possible to provide an optional long-period timeout circuit to automatically release a HOLD condition.

Clearing and Release

Digits which have been registered can be cleared at any time by depressing the CLEAR key 2. This feature can be used to correct a keying error or to select a new point before timeout takes place such as when checking a series of points rapidly. In addition to its seizing function, already described, the Clear Lead (CL) inverting transistor, AQ2 (FIG. 4) provides a positive bias to the Reset (RS) bus which resets all but one flipflop in the entire system (including the Hold flipflop—thus the Hold key must be depressed after clearing if a hold condition is still desired).

The one flipflop which must not be reset is, of course, the stopping flipflop A2A. This is isolated from the rest of the system by diodes ACR1 and ACR2 and can be reset only by a pulse generated by the timeout circuit. Upon receiving such a pulse, the whole system is released and returned to the Idle condition.

The delay between clearing and releasing is purposely maintained in order to permit a control station to correct an error without the danger of another station stealing the system before he can key up the new number.

Continuity Check

Upon release of the third digit numeric key, the Start Read (STR) lead (FIGS. 5B and 11) become positively biased causing transistor CQ1 to become conductive and to operate the Cut-through (CT) relay (FIG. 12). The thermocouple pair (TC1 and TC2) are extended through the Test (TST) relay to the logic circuitry of FIG. 11.

A 400-cycle tone produced by the phase shift oscillator involving transistor CQ2 and emitter follower CQ3 is coupled to the thermocouple pair by transformer CT1 which maintains isolation from ground. The current through the transformer produces a drop across CR9 which is rectified, integrated, and applied to flipflop CA1. The circuit is adjusted so that a suitably low resistance in the thermocouple loop will produce enough drop to transfer the flipflop to the Set condition. Any higher resistance will fail to effect this transfer. A desirable setting is 1.5K ohms so that the circuit will securely operate on a loop of 1000 ohms or less and securely fail to operate on a loop of 2000 ohms or more.

At the same time the (STR) lead became positive the $\overline{(STR)}$ became grounded to enable an input of the two-input NAND gate CA1 (FIG. 11). Since the other input is already enabled by the (0) output of the flipflop CA2, the gate provides a positive output to operate the transistor CQ5 controlling the red background illumination of the Temperature Display (TD) at the control stations.

It is evident that the red background illumination is switched on when the Continuity Check circuit is activated. If, however, the thermocouple pair is found to be within the required resistance limits, the two-input gate CA1 will be disabled as soon as the flipflop CA2 transfers to the Set condition. Since the integration period extends over approximately 10 milliseconds, the red background will persist for at least this period and thus give a brief flash indicating to the operator that the test has taken place. If the loop resistance is not within limits, the flipflop will remain in the Reset condition and the red background will remain illuminated until either the trouble is corrected or the system is cleared.

It can therefore be seen that the thermocouple at, for example, station 122 can be tested by clearing and then depressing in order the 1, 2 and again 2 of the keyset in FIG. 2. The operation of the clear key under the control of the allotter, will lock out all other key sets and reset the steering counter. Therefore the only registers primed initially will be the hundreds register (FIG. 12) and specifically the gate HN1 thereon due to the STH signal. The depression of the "1" key opens gate HN1 and sets flipflop NF1, the relay providing a signal on the HG1 lead and priming all gates in the tens-one hundreds circuit of FIG. 6, but not those of the remaining tens-hundreds circuits.

Figure 9:
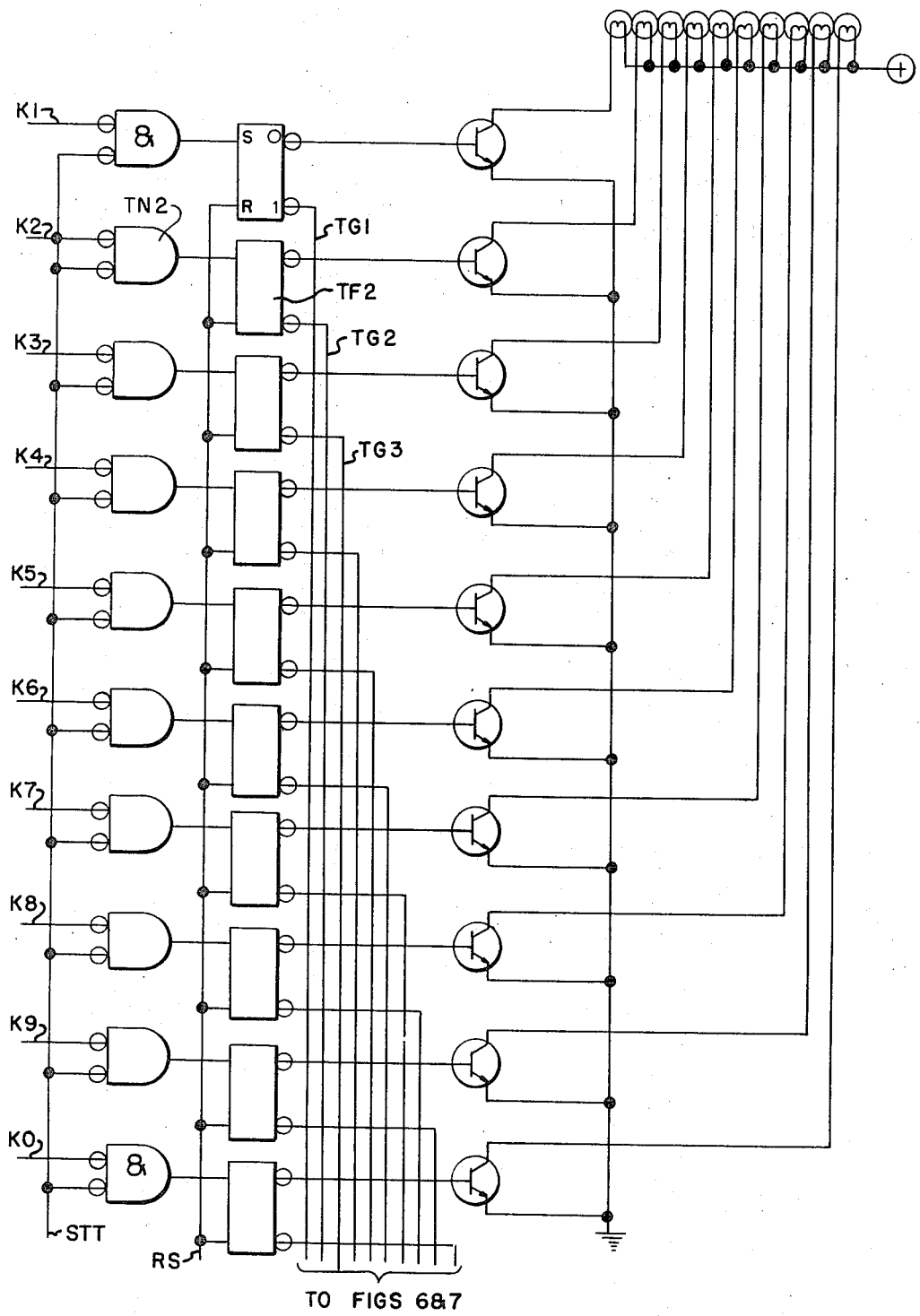
FIG. 9 is a circuit diagram of the tens register circuit of the present invention.

Release of the "1" key operates an Advance signal and sets the steering counter to provide a signal only on the STT line and primes the gates of the tens register of FIG. 9. The subsequent depression of the "2" key of the keyset will open gate TN2 and set flipflop TF2. The output of flipflop TF2 passes to the "2" gate of each gate driver (FIGS. 6 and 7). Since the gate THN2 (FIG. 6) is the only primed "2" gate, an output is provided therefrom to cause transistor THQ2 to conduct and operate the associated relays THR1 and THR2. This will close all of the switches on the relay card thereof as shown on the left hand side of FIG. 12.

Release of the "2" key again operates the Advance signal and sets the steering counter (FIG. 5) to provide a signal only on the STU line and primes the gates of the units register (FIG. 8). The subsequent depression of the "2" key of the keyset will open gate TU2 and set flipflop UF2. The output of flipflop UF2 operates a transistor UQ2 which operates a transistor UQ2 which operates relay UR2. The relay UR2, also shown in FIG 12, closes the corresponding switch (FIG. 12) and completes the circuit from thermocouple 122 (TC122) to the digitizer and the continuity checker.

Figure 10:
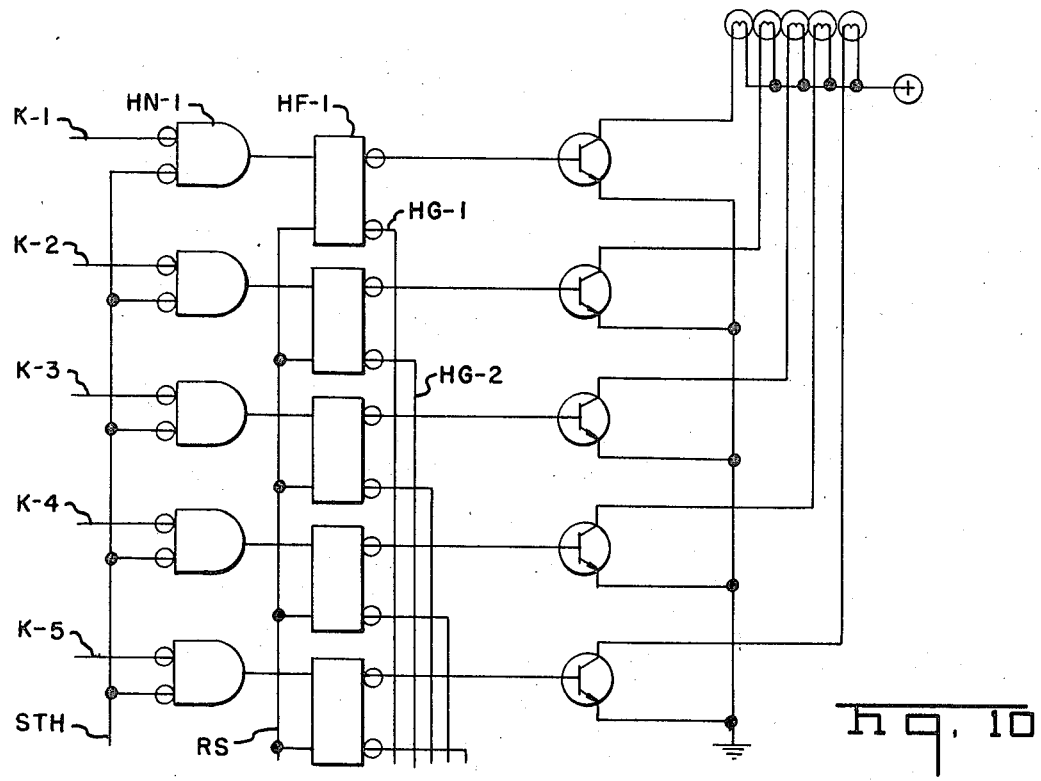
FIG. 10 is a circuit diagram of the hundreds register circuit of the present invention.

The lamps in FIGS. 8 to 10 are provided at each keyset to provide an indication of the station under test.

Digitizer

The digitizer which converts the analogue thermocouple signal to a digital output can be a standard TRANSMATION LINITEMP or other suitable device.

When taking a thermocouple temperature reading, it is often the practice to integrate the incoming thermocouple signal to reduce the effect of spurious transient signals. Very often, the time constant employed is quite appreciable—being in the order of a second or more.

The operation of a digitizer can be rapid and it can be readily seen that the first readings of a temperature point could be in error due to the fact that the incoming signal has been applied to the integrating signal conditioner for insufficient time for it to reach the ultimate voltage or current level. The net result is, unless corrective action is taken, to have the first several temperature displays after a temperature point has been addressed and switched through show a changing value. This is both confusing and annoying to an observer.

To obviate this situation, the monitor system provides a delay, after extending the thermocouple pair to the digitizer, before making any temperature display—the display windows remaining dark during this period. The delay provides sufficient time for the signal integration to be accomplished and for the voltage or current level to reach stability. When the digitizer output is eventually extended to the display, the proper and only the proper reading will be observed.

The action of the digitizer is initiated upon the conclusion of the continuity check signified, when successful, by the transfer of the flipflop CA2 of FIG. 11 from the reset to the set condition. Through the action of buffer transistor CQ4, the Test (TST) relay of FIG. 12 is operated to not only transfer the signal pair away from the continuity check circuit to the signal input of the digitizer but also, by means of contacts in the READ circuit, starts the digitizer logic. A timing capacitor in the digitizer logic disables the display output for a period sufficient to allow the signal integrator to reach stability. This period can be adjusted by properly choosing the capacitor value.

DETAILED CIRCUIT DESCRIPTION

Allotter

The Allotter (FIG. 4) includes the components required for the following functions:

(1) Allotting
(2) Clearing
(3) Ring Stopping
(4) Timeout
(5) Timing Reset

Ring Circuit

For each control station there is provided a stage in the ring comprising a flipflop such as A2B, A1B, and A3B. Each stage has an associated combination buffer and two-input AND gate such as AQ8, AQ9 for flipflop A1B.

The ring is driven, during the system idle condition, by a free-running unijunction oscillator involving AQ1. Capacitor AC4 is charged through AR5 from positive bias supplied through inverter A1C. When the potential on AC4 is adequate to cause AQ1 to be conductive, AC4 will discharge to ground through AQ1 and resistor AR6. Since AR6 is of small value, the discharge time will be extremely rapid and a very sharp pulse only a few microseconds long will be developed. Conduction will cease when the potential on AC4 drops to a critical level and the process is repeated until the positive bias is removed. The repetition rate is in the order of 1000 cycles per second although this value is not at all critical.

Each positive pulse generated by the unijunction oscillator involving AQ1 is applied to the Reset inputs of the ring stages A1B, A2B and A3B. For purposes of illustration, let it be assumed that A2B is in the Set condition and the remaining stages are in the Reset condition. A drive pulse will effect the transfer of A2B to the Reset condition but will have no effect on the other stages since they are already in the Reset condition.

When A2B goes into the Reset condition, the 1 output will go positive since the Set half of the flipflop becomes non-conductive. This will cause a postive pulse to appear on the Set input of A3B, the length of the pulse determined by the time constant of AC3 and the load which includes the flipflop input as well as AR3, and also the source which includes the internal collector resistor of the integrated circuit. This positive pulse will effect the transfer of A3B into its Set condition.

It should be noted that, for a brief period, both the Set and Reset sides of the third stage flipflop A3B are driven, one side by the drive pulse and the other side by the interstage pulse.

The time constants have been chosen so that the interstage pulse is several times longer in duration than the drive pulse and thus the stage will always be left in the Set condition.

Upon the appearance of the succeeding drive pulse, A3B will be returned to the Reset condition, thus developing an interstage pulse to transfer A1B to its Set condition. This process is repeated successively so that one stage is transferred at a time in rotation and only one stage will be in a Set condition at a time.

When the power is first turned on, the several stages may be either Set or Reset depending upon random circumstances. A thorough analysis of the sequence of events shows that the ring will automatically stabilize to a pattern of only one stage being in the Set condition at a time upon being driven. On many occasions, however, the ring will come on in a pattern of all stages being in the Reset condition and thus is stalled. To automatically correct this condition, priming diode ACR3 provides a path for a starting pulse which will transfer the first ring stage to the Set condition and start the rotation of the ring. The starting pulse is actually the reset pulse generated by the timeout circuit.

Ring Stopping and Clearing Circuit

The ring is stopped by depressing the CLEAR key 4.

All keys operate by grounding the respective lead and removing a normal positive bias. The bias is relatively high, being furnished by a 24-volt source divided down, in the case of the Clear (CL) lead by a ratio of about 2:1. This would require the introduction of a negative transient pulse to cause a false operation. The grounding of the (CL) lead will cause a low current flow at the key contact and thus the circuit can be considered intrinsically safe.

The "ground" applied to the (CL) lead is not a true ground but somewhat positive due to the saturation voltage drop across semiconductors such as AQ9. In some instances, this positive potential might be enough to cause at least partial conduction in the transistor being controlled. AR9 and AR10 form a voltage dividing circuit which reduces this residual bias to a small value and thus AQ2 will be fully cut off.

Capacitor AC5 provides protection against high frequency transients which, if sufficiently negative to overcome the positive bias, might cause false operation of the ring stopping circuit.

Removal of positive bias from AQ2 permits a positive bias to appear on the (RS) lead and the resulting action of immediate importance is to effect the transfer of the ring stopping flip-flop A2A to the Set condition which locks. A positive potential will appear on the flip-flop A2A output 0 which causes the inverter A1C to become conductive and cut off the positive bias to the unijunction oscillator AQ1. Although it might at first appear that the unijunction bias could be obtained directly from the A2A1 output and thus the inverter could be eliminated, it should be noted that A2A is also used to activate A1A and thus full output is not available. The use of the inverter assures maximum bias. The other A1C input is grounded to inactivate it.

Since AQ1 is no longer oscillating, the ring is stopped and the system is thus put at the disposal of the station which stopped it until timeout takes place.

The positive signal on the (RS) lead will also reset all the flip-flops in the entire system except the ring stopping flip-flop A2A. This is only incidental but does serve to clear all registers of information which might have been stored accidentally while servicing the system.

Isolating diode ACR1 prevents the signal from AQ2 from being shunted off by the relatively low resistance in base #2 of AQ3. Isolating diode ACR2 prevents the automatic clear signal generated by AQ3 from operating the stopping flip-flop which, otherwise, would merely effect the reseizure of the system and defeat the purpose of AQ3.

Inasmuch as the output of AQ2 will be sustained as long as the CLEAR key is held depressed (being a DC function), the system can be kept in a hold condition this way, but due to a somewhat uncertain time race reaction when automatic reset develops upon timeout, the ring may well be advanced during reseizure and the system lost to another control station which may be camping on. Holding the CLEAR key serves no useful purpose and thus the system does not provide for this action.

Timeout

This feature is provided primary to prevent the system from being tied up accidentally as might well be the case if the operator were to be required to perform some sort of release function at the conclusion of each reading.

Timeout is under the control of unijunction oscillator AQ3 which has a long time constant afforded by AC6 and variable resistor AR14. It is adjustable, because of AR14, to any timeout period between a fraction of a second and approximately 10 seconds (depending on the particular components). It has been found that a timeout period of approximately three seconds provides a good compromise between adequate reading time and tolerable delay.

Timeout is instituted by the transfer of the stopping flip-flop A2A to the Set condition upon seizure resulting from depressing the CLEAR key. The removal of positive bias from A2A output 1 renders the two-input NAND gate A1A non-conductive (the second input normally being a ground condition). This provides a positive output bias from A1A to activate AQ3.

Unless further action is taken, AC6 will ultimately charge to the breakdown potential of AQ3 and be discharged through base #2, thus providing a short positive pulse of considerable current magnitude to reset all flip-flops in the system except the stopping flip-flop A2A.

The output voltage from AQ3 will not be the full voltage of the supply and is further dropped by ACR1. To improve the performance of this circuit, an emitter-follower AQ14 has been added to the RSR lead to provide current amplification. This circuit has the least voltage margin of the system and can be used as a "marker" in the voltage margin test which evaluates the overall system performance.

Hold

The timeout circuit involving AQ3 can be inactivated as long as desired by depressing the HOLD key. The consequent grounding of the HLD lead removes positive bias from AQ10. The resistor capacitor network AR23, AR24 and AC7 protects AQ10 from false operation from induced transients. The resulting positive output is applied to transfer holding flip-flop A1D to the set condition. This in turn causes a positive bias to appear on the 0 output A1D to cause the second input of gate A1A to cut off the supply to Q3. Timeout is thereby arrested until the holding flip-flop is reset by depressing the CLEAR key and developing a positive reset potential on the (CL) lead.

Timing Reset

The purpose of the timing reset feature is to provide adequate time for keying the number of the desired point without affecting the time available for reading. If, for instance, the timeout period is three seconds and the operator required two seconds to key up the point, only one second of reading time would be left if it were not for the action of the timing reset.

The circuit is activated by the depressing of any numeric key which grounds the Advance (ADV) lead. The removal of bias causes inverter AQ11 to become non-conductive and, in turn, to apply a positive bias to the base of the discharge transistor AQ12. The conduction of AQ12 prevents AC6 from assuming a charge and removes any charge which may have accumulated. The release of the numeric key reverses the action and the timeout action is permitted to start again.

It can be readily seen that the timeout circuit is discharged and reset each time a numeric key is depressed. If the timeout period is three seconds, the operator may take nearly three seconds to select each digit for a total of nearly nine seconds. He is still provided a full three seconds of reading time at the end of the keying period.

A temporary hold condition can be effected by holding any numeric key depressed after the digit selection process has been completed. Since the registers are inactivated after the third digit, nothing more will happen than to keep the timing reset circuit energized.

The CLEAR key does not affect timing reset and the system may be released subsequent to depressing the CLEAR key after observing a reading.

Keyset Termination

The Keyset Termination circuit (FIG. 3) performs three functions:

(1) Provides control bias for register gates.
(2) Reduces residual bias due to saturation voltage and line drop to a value which will not permit false operation of a gate.
(3) Filters out crosstalk signals which might be coupled to the lines interconnecting the keyset and the equipment cabinet.

Normally the keyset (KS) lines and output busses are held at a positive bias which maintains conduction in the register gates and thus inactivates them. Depressing a numeric key reduces this bias to nearly zero on the selected line and activates the associated register gates on one of their two inputs.

The idle bias can be, for example, on the order of +14 volts on the keyset lines and in excess of +1 volt on the output busses. The off-normal residual bias can measure on the order of +1 volt on the keyset line and +0.45 on the bus. The residual bias is due to the saturation drop across the two gating transistors AQ4 to AQ9 and protective diode ACR4 to ACR6 in the Allotter (FIG. 4) as well as the keyset loop. The keyset line current can be about 8 milliamperes and permit a loop resistance of about 50 ohms for a maximum allowable residual bias of approximately +1.5 volts.

Since most transistors are conductive when the base is positively biased at 0.7 volt, it is evident that the undivided residual bias of +1 volt would be more than enough to maintain conduction at a time when cutoff is desired. Examining the dividing network for keyset line #1 (KS1), it will be found that KR38 and KR39 form a divider of about 2.2:1 (since the resistors are ±10%, the ratio will average 2:1). The normal residual bias is thus reduced to a value below +0.7 volt and thus the associated gates are rendered non-conductive.

Due to the higher-than-normal collector voltage used with the integrated circuits, the minimum conductive bias appears to be in the order of +0.8 volt. In addition, there is a slight additional drop across the bus resistor KR37 and thus the system will function securely with a residual line bias of +1.5 although the dividing factor might seem inadequate.

During the idle period, the 24-volt bias applied through KR37 is divided down by a factor of about 3.5:1 to provide a potential bias of approximately +7 volts. Since, however, all the gates will be conducting, the drop through the network will be such as to reduce the bus bias to slightly more than +1 volt. The system will not operate satisfactorily if this bias is less than +0.9 volt and a value this low is indicative of circuit fault.

The purpose of KR40 is to limit the keyset line current when a key is depressed and the circuit is grounded. The current has been purposely maintained at less than 10 milliamperes to render it intrinsically safe under normal control room conditions. Other networks can be made available to either extend the loop resistance or reduce the line current to still lower values.

It is evident that a gate cannot be falsely operated by cross-talk unless the spurious signal is in the order of −14 volts and can cancel the line bias. To induce a signal of −14 volts at 9 milliamperes would require an adjacent signal of extremely large proportions or one of extremely high frequency. Since there are, as field experience indicates, extremely sharp wavefront transients developed by the switching of heavy inductive industrial loads and these can be of impressive magnitude, the keyset network is provided with additional protection in the form of KC10 which acts against KR38 to form a frequency sensitive dividing network which becomes effective at only 80 cycles. The division becomes several hundred to one in the kilocycle region.

Positive transients can cause no anomalies during either idle or selected conditions unless they are of such enormous magnitude as to cause clamping and the developing of a continuous positive bias.

Gate-Driver

The purpose of the gate-driver circuit (FIGS. 6 and 7) is to combine Tens and Hundreds information stored in the Register to enable a single gang relay to operate thereby cutting through a group of ten thermocouple lines to the Units switching relays.

Each FIGS. 6 and 7 circuit includes enough components to control ten gang relays or a total of 100 signal pairs, thus only one FIG. 6 and 7 circuit per 100 points is required in a system.

Each gate (FIGS. 6 and 7) is provided an individual Tens input over an associated Tens Gate (TG1, TG2, etc.). The normal condition with system idle is a positive bias of between 1 and 3 volts. This holds the gate conductive regardless of the bias condition on the other input. This positive bias is derived from the One (1) outputs of the Ten Register flipflops.

The enablement of the entire bank of gates of FIG. 6 or 7 is controlled by the Hundreds input of the Hundreds Gate (HG—) lead which would be designated (HG1) in the case of the #1 hundreds group, (HG2) in the case of the #2 hundreds group, etc. The HG1 signal is amplified by inverter HQ11 and the HG2 signal is amplified by inverter HQ12.

The normal condition of an (HG—) lead is also positive. If, however, the particular group is selected, the lead goes to ground, causing the associated inverter to become non-conductive, allowing a positive bias to appear on the input of HQ11 (FIG. 6), and allows a positive bias to appear on the second input of all gates. If, for example, the Tens digit 2 is registered, (TG-2) also goes to ground. This will be the only gate with both inputs grounded and it will be non-conductive, permitting the output of THN2 to go positive. The output buffer transistor THQ2 becomes conductive and operates the corresponding gang relay THR1 and THR2 to operate over the output lead.

Steering Card

The function of the Steering circuit (FIG. 5B) is to direct each of the three keyed digits to its own register (which "remembers" which numeric key has been depressed).

The basic Steering circuit consists of a four stage "chain" employing flipflops S2A, S2B, S2C and S2D. The operation of this chain is very similar to the "ring" in the Allotter (FIG. 4) except that it is not reentrant and cannot progress past the fourth stage.

The chain must be "primed" into the proper starting pattern at the ouset of each use. This is accomplished by applying the reset pulse carried by the (RS) lead to the Set input of the first stage and the Reset inputs of the remaining stages.

The chain is driven by a sharp pulse generated by the Schmitt trigger circuit involving SQ4 and SQ5 each time a numeric key is released. This pulse is applied to the Reset inputs of all four stages. Assuming the chain to be in position for accepting the first digit, the last three stages are already in a Reset condition and thus the advance pulse does not affect them. The first stage, however, is in the Set condition and is thus transferred back to the Reset condition. The resulting positive output from the One (1) output is converted to a pulse by SC3 which differentiates the leading edge. This is applied to the Set input of the second stage to effect the transfer.

As in the case of the ring of the Allotter (FIG. 4), the duration of the interstage pulse must be appreciably greater than that of the drive pulse. It will be noted that the coupling capacitor SC3 is appreciably larger than SC4 which develops the drive pulse from the output of the Schmitt trigger, thus there will be a considerable difference in the durations of the two.

The possible counting speed of the chain is extremely high, the speed being limited primarily by the time constants of the coupling circuits. The chain is therefore capable of advancing several steps when only one is intended due to such things as contact bounce in keys. It is also inherently capable of advancing on receipt of minute transients picked up in connecting cables. To protect against this, the Advance (ADV) lead is equipped with a bias, dividing, and time constant network very similar to that of all other leads except that the time constant is somewhat larger for reasons to be explained later. The output signal derived from the network upon a key depression and release is much too rounded to be suitable for driving the chain. It is therefore applied to the Schmitt trigger for reshaping.

SQ4 and SQ5 comprise the Schmitt trigger which appears to be nothing more than a two-stage amplifier. Due to the fact that the two transistors share the same emitter resistor, there is a positive feedback from the common coupling. When idle, SQ5 is conducting by virtue of the normal positive bias and thus SQ4 is cut off. When the bias is removed by depressing any numeric key, SQ5 will start to cutoff. As the emitter current is reduced, the emitter bias of SQ4 will be reduced at the same time the base bias is becoming more positive. As SQ4 starts to conduct, the emitter bias becomes greater, thus hastening the cutoff of SQ5. The interaction continues until saturation takes place and is virtually independent of the rate at which the input signal changes. The effect is to cause a complete and almost immediate transfer from cutoff to saturation in SQ4 to produce a very steep wavefront. The negative output is, however, ignored by the chain.

When the numeric key is released, the action is reversed and SQ4 is caused to cut off very rapidly so as to produce a sharp trailing edge which, when differentiated by SC4 is converted to a sharp pulse of short duration.

The two static state emitter biases are deliberately made different to introduce a hysteresis which requires that a higher input bias is required to transfer the Schmitt back to normal than was required to trigger it. This introduces an additional protection against the effect of transients and contact bounce since, when once triggered, the Schmitt requires a significant change of input condition to reverse its action.

The "0" outputs of each of the first three chain flipflops are applied to a buffer gate (SQ3, SQ2, SQ1) to control the bias applied to the three sets of registers. The lamps serve both as bias resistors and indicators as an aid in servicing. Only one lamp should be on at a time and each depression of a numeric key serves to advance the lamps.

The last stage of the chain is not coupled to any other and thus will remain Set regardless of any subsequent application of drive pulses. It thus serves to terminate the steering process. The two outputs of this flipflop are employed by the continuity checking circuit.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A monitor system comprising a plurality of remote transducers, at least one central station and means adjacent said transducers and responsive to said central station to connect said transducer to said central station, said means comprising a plurality of integer storage register banks, a plurality of switches responsive to said register banks, means at said central station for resetting all of said register banks, first means responsive to said means at said central station for initially priming a predetermined first one of said register banks, said registers of each of said storage register banks being responsive to simultaneous operation of one of said integer switches and said priming, and second means responsive to the operation of said integer switch for priming a predetermined second one of said register banks, further including means concurrently responsive to each of said register banks for selectively connecting a predetermined one of said transducers to said means in the area of said transducers, further including, means responsive to said means at one said central station for resetting, for preventing operation of the remaining said central station.

2. A monitor system comprising a plurality of remote transducers, at least one central station and means adjacent said transducers and responsive to said central station to connect said transducer to said central station, said means comprising a plurality of integer storage register banks, a plurality of switches responsive to said register banks, means at said central station for resetting all of said register banks, first means responsive to said means at said central station for initially priming a predetermined first one of said register banks, said registers of each of said storage register banks being responsive to simultaneous operation of one of said integer switches and said priming, and second means responsive to the operation of said integer switch for priming a predetermined second one of said register banks, further including means concurrently responsive to each of said register banks for selectively connecting a predetermined one of said transducers to said means in the area of said transducers, further including means responsive to said means for priming and the selective connection of said predetermined one of said transducers to said means in the area of said transducers for testing the continuity of said circuit.

3. A monitor system as set forth in claim 2 further including an alarm means responsive to said first means for priming.

4. A monitor system as set forth in claim 3 wherein said means for testing includes means for passing a signal from said means adjacent said transducers to said predetermined one of said transducers bistable means responsive to said signal for assuming a first one of its stable states responsive to said first means for priming for operating said alarm and responsive to a predetermined condition of said signal for assuming the second one of its stable states to disengage said alarm.

References Cited

UNITED STATES PATENTS

| | | | |
|---|---|---|---|
| 3,231,675 | 1/1966 | Riddell | 179—18 |
| 3,383,467 | 5/1968 | New et al. | 340—151 |

DONALD J. YUSKO, Primary Examiner

U.S. Cl. X.R.

179—18